Figure 1:
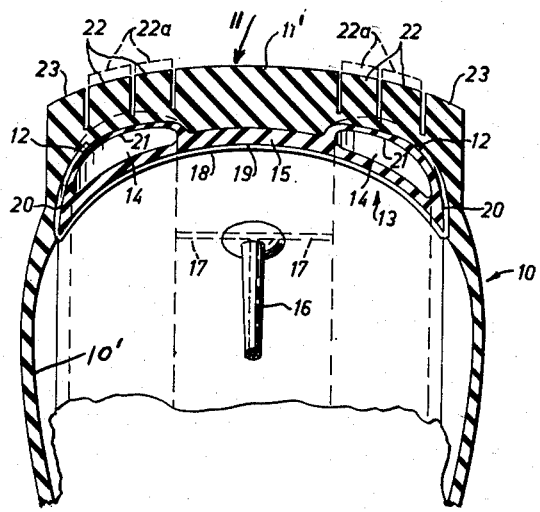

May 20, 1958   T. J. GEDGE   2,835,302
ADJUSTABLE PNEUMATIC TIRE
Filed Dec. 30, 1955

Inventor
THOMAS J. GEDGE
by: J. Richard Cavanagh

United States Patent Office 2,835,302
Patented May 20, 1958

---

2,835,302

ADJUSTABLE PNEUMATIC TIRE

Thomas James Gedge, Toronto, Ontario, Canada

Application December 30, 1955, Serial No. 554,657

1 Claim. (Cl. 152—208)

This invention relates to an adjustable pneumatic tire.

It is the main object of the invention to provide a pneumatic tire of the tubeless class, embodying inflatable chambers adapted to project tread portions thereof relative to other tread portions to increase traction on wet or slippery roads and in particular, on snow.

It is another object of the invention to provide a pneumatic tire adapted by supplementary inflation to provide a snow tire tread surface.

Other objects of the invention will be appreciated by a study of the following specification, taken in conjunction with the accompanying drawings.

Figure 2:
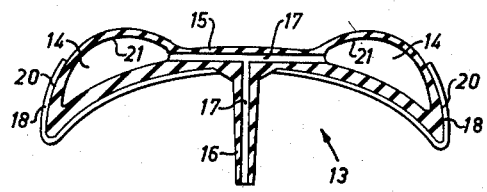

In the drawings:

Figure 1 shows a sectional conventional tubeless tire modified to accommodate a supplementary expansible tube of the invention; and Figure 2 is a sectional view of the expansible tire tube of Figure 1 taken across the air tube thereof.

Referring to the drawings, a substantially conventional tubeless tire case 10 providing a primary air chamber 10' and having circumferentially extending tread 11 embodies parallel spaced apart supplementary air chamber annular recesses 12. A supplementary tire tube 13 of special form having expansible annular chamber portions 14 spaced apart by web 15 seats in the recesses 12 and carries an air tube 16 communicating by passages 17 to chambers 14 substantially as shown.

An expansion restraining fabric 18 covers the entire surface 19 of tube 13 and extends over the side surfaces 20 thereof to restrain the rubber body material of the tube against expansion under internal pressure except in the region of the outer walls 21 of the chambers 14.

In operation, the normal tread formation shown in bold lines is modified by inflating the chambers 14 of supplementary tire tube 13 causing expanding walls 21 to force the overlying intermediate treads 22 outwardly as indicated by chain lines 22a beyond the normal contours of centrally located tread 11' and outer tread 23. The air tube 16 is connected by conventional means to an air valve (not shown) and which is spaced from that used for general inflation of the tire case.

It is intended that the present disclosure should not be construed in a sense limiting the number or form of treads which may be employed having regard to the concept and structure set forth herein by way of illustrating the invention.

What I claim as my invention is:

In combination: an inflatable tire case having an inner surface defining a primary air chamber and outer surface having a plurality of laterally spaced apart circumferentially extending tread members forming a part of said case and comprising two outer tread members, at least two intermediate tread members and at least one substantially centrally located tread member between said intermediate tread members; two parallel laterally spaced apart continuous annular recesses extending radially into the inner surfaces of said case beneath said intermediate tread members; a supplementary tire tube having two expansible chambers the outward surfaces of which are seatable in said recesses and the inward surfaces thereof being disposed in said primary air chamber; web means extending between said expansible chambers and forming part of said supplementary tire tube; means in said web for communicating supplementary air to said expansible chambers; and means reinforcing the inward surfaces of said tube providing expansion of said expansible chambers upon inflation of the latter to effect radially outward positioning of the said intermediate tread members.

References Cited in the file of this patent

UNITED STATES PATENTS

| | | |
|---|---|---|
| 2,480,548 | Carhart | Aug. 30, 1949 |
| 2,491,491 | Freygang | Dec. 20, 1949 |
| 2,708,470 | Gramelspacher | May 17, 1955 |